Patented May 23, 1944

2,349,326

UNITED STATES PATENT OFFICE 2,349,326

EMULSION

Alexander L. Wilson, Pittsburgh, Pa., assignor to Carbide and Carbon Chemicals Corporation, a corporation of New York No Drawing. Application December 31, 1938, Serial No. 248,878

14 Claims. (Cl. 106—271)

This invention is concerned with the production of improved emulsions and it includes certain novel emulsifying agents. A further feature of the invention is the formation of emulsions having a volatile continuous phase, and which are adapted to produce useful films or coatings formed of the discontinuous, or dispersed, phase on surfaces to which the emulsions are applied. The films or coatings so produced are characterized by the fact that they are difficultly redispersible after evaporation of the continuous phase, and are substantially unaffected by further contact with liquids, such as that of the continuous phase.

It has long been known that many substances which are mutually incompatible can be dispersed one within the other to form emulsions. Emulsions have been formed by the use of ordinary soaps, and more recently emulsions have been made through the use of organic bases, for example, the ethanolamines combined with fatty substances. Soap-like materials have also been made and used for forming emulsions from ammonia by its reaction with fatty acids and the like.

A special and comparatively recent development in the use of these known emulsifying agents is the production of the so-called rubless or self-lustering polishes in which waxes and other substances capable of producing a polish on various surfaces are dispersed by means of the emulsifying agent in various liquids, of which the most common is water. This emulsion is then spread as a thin film upon the surface to be polished and, on evaporation of the liquid, it deposits a film of the dispersed materials thus providing a polished coating for the surface. In this particular type of emulsion the prior art materials in every case possess various disadvantages. For example, the non-volatile soaps of the alkali metals and the relatively non-volatile emulsifying agents formed from triethanolamine and similar high boiling organic bases, remain in the film of polish after the volatile liquid is evaporated. If the polished surface is then brought in contact with water or other liquids, the presence of the emulsifying agent in the film causes at least partial reemulsification, resulting in disintegration and spotting of the polish. In the case of emulsions produced by means of soaps formed from ammonia the base is too volatile, which severely handicaps proper formulation of the emulsion, particularly in the case of emulsions containing waxes because they must be prepared at temperatures up to the boiling point of water. Also, the ammonia is lost during storage of the emulsion, and it tends to evaporate too rapidly from the film, thus failing to keep the film homogeneous during evaporation of the continuous phase.

The principal object of the invention is to provide novel emulsions and certain novel and economical emulsifying agents for use in producing dispersions of various materials in a wide variety of substances. A further object of the invention is to provide improved emulsions adapted to produce films of the dispersed material, especially those of the type described above as rubless polishes.

The objects of this invention can be attained and useful emulsions may be simply and economically produced through the use of the reaction products of morpholine, or highly basic, water-soluble morpholine addition and substitution products, with fatty substances. The emulsions produced by means of this invention are substantially free from the disadvantages which accompany the use of previously known emulsifying agents, particularly in the formulation of rubless polishes and other emulsions designed to produce films of the emulsified materials.

Morpholine,

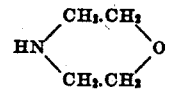

a moderately volatile liquid may be prepared by methods which are well known in the art. This substance has a specific gravity of 1.0016 at 20°/20° C., and boils at 128.3° C. It is water soluble, highly basic (having a pH in 25% aqueous solution of about 11.2), and it combines readily with fatty substances, such as the common fatty acids and other high molecular weight acidic soap-forming materials. The reaction products obtained by this combination appear to be more or less loosely formed, and on standing, especially in the presence of water, the morpholine base is gradually released and is lost from the combination.

Morpholine addition and substitution products are strongly basic, moderately volatile, water-soluble, and possess the same desirable properties of morpholine, e. g. of combining readily with fatty substances, such as common fatty acids, high molecular weight soap-forming acids, and their acid derivatives. The morpholine derivatives which are particularly suitable for purposes of this invention are those whose boiling points or the boiling points of whose azeotropic water solutions lie between about 90° and about 150° C.

Morpholine and some of its alkyl, alkylene, alkyloxy and alkylenoxy derivatives which are volatile within the range indicated, and also especially adaptable as emulsifying constituents, include the following:

| | Boiling point, °C. |
|---|---|
| Morpholine | 128 |
| 2,6 dimethyl morpholine | 144 |
| N-ethyl morpholine | 137 |
| N-methyl morpholine and water [1] | 93 |
| N-ethoxy ethyl morpholine and water [1] | 99 |
| N-vinoxy ethyl morpholine and water [1] | 99 |

[1] Azeotropic mixture.

The fatty substances suitable for combining with these morpholine derivatives in forming the new emulsifying agents, and referred to herein, may be oleic, palmitic, stearic, ricinoleic, and other common fatty acids as well as various combinations of these and other naturally occurring fatty acids, or similar acidic high molecular weight materials, such as the higher alkyl derivatives of acetic and sulfuric acids.

The following examples, in which all of the formulae are given in parts by weight of the several materials, will serve to illustrate the invention:

*Example I*

| Amine | Water | Oil | Fatty acid |
|---|---|---|---|
| N-vinoxy ethyl morpholine... 0.4 | 10 | Paraffin...... 9 | Oleic acid...... 1 |
| 2,6-dimethyl morpholine. 0.3 | 5 | Paraffin...... 4 | Oleic acid.... 1 |
| Morpholine.. 0.25 | 10 | Olive oil.... 11 | Oleic acid.... 1.9 |
| Morpholine.. 0.27 | 10 | Naphtha..... 8 | Oleic acid.... 1.4 |
| N-methyl morpholine. 3.4 | 100 | Ethylene dichloride. 86 | Oleic acid.... 10 |
| N-methyl morpholine. 2.5 | 100 | Kerosene..... 89 | Oleic acid.... 8 |

The amine was dissolved in the water and this solution agitated with the solution prepared from the oil and oleic acid. Creamy white, oil-in-water emulsions resulted, which were stable when diluted with ten parts of water.

*Example II*

| Amine | Water | Wax | Fatty acid |
|---|---|---|---|
| Morpholine.. 0.34 | 50 | Beeswax... 14.5 | Stearic acid... 1.5 |
| N-methyl morpholine. 3.4 | 400 | Carnauba wax...... 87 | Stearic acid... 9 |

In preparing these wax emulsions, the water, amine, and fatty acid were heated to give a smooth soap solution. To this, the melted wax was added with vigorous stirring. The emulsions were creamy white when prepared in the manner indicated.

The following examples illustrate the formation of a rubless polish:

*Example III*

| Part 1 | Part 2 |
|---|---|
| Carnauba wax.... 72 | Shellac........... 10 |
| Oleic acid........ 15.3 | Morpholine....... 1.1 |
| Morpholine....... 14.4 | Water............ 100 |
| Water............ 430 | |

The carnauba wax was carefully melted, and the oleic acid followed by the morpholine, slowly stirred in, to give a clear solution. Then water at the boiling point was slowly added with continuous stirring, the whole product being maintained hot over a steam bath. To this product, on cooling, was added a solution made by warming together the shellac, morpholine, and water of the second part of the formula. When laid as a film on glass, after one hour's standing, a bright polish was obtained, which became only slightly cloudy when sprinkled with water. A corresponding film deposited from an emulsion made by means of a triethanolamine soap completely disintegrated when sprinkled with water. After drying twelve hours, the morpholine polish showed no cloudiness when immersed in water. The films were very clear and lustrous, and no buffing was required. By reducing the amount of water from 430 parts to as low as about 267 parts, in the above formula, an emulsion giving films of greater depth, brilliance and better coverage on rough surfaces is obtained. For the shellac, other alkali-dispersible resins may be substituted, such as rosin or Manila resins to obtain improvement in the "wetting" or "flow-out" characteristics of the emulsion when applied to surfaces, which results in a particularly smooth and level spreading film. Manila (such as pontianac) resins, in general, are suitable for this use and the preferred grades are those which are fairly easily dispersible in the emulsion. If desired, part of the morpholine in the formula may be replaced by borax, but such a change produces a polish exhibiting less water-resistance in the dried film.

*Example IV*

| Part 1 | Part 2 |
|---|---|
| Carnauba wax........ 52.8 | Shellac......... 4.4 |
| Oleic acid............ 6.0 | Morpholine... 2.0 |
| N-methyl morpholine.............. 6.4 | Water.......... 100.0 |
| Borax................ 4.0 | |
| Water................ 400.0 | |

The carnauba wax was carefully melted, and the oleic acid followed by the N-methyl morpholine, slowly stirred in to give a clear solution. The borax was dissolved in ten parts of water and stirred into this mixture producing a gelatinous mass. The remainder of the water at the boiling point was added slowly with continuous stirring, the whole mixture being maintained hot over a steam bath, and then allowed to cool. A solution made by warming together the shellac, morpholine and water of the second part of the formula was now slowly stirred into the mixture of the first part until completely cool. This resulted in a polish of good quality.

Other morpholine derivatives than the ones cited may be used in the preparation of the surface coating emulsions of this invention, provided the derivatives or their azeotropic mixtures with water boil between about 90° and about 150° C. Various other modifications will be apparent and are included within the invention as defined by the appended claims.

This application contains material in common with copending application Serial No. 107,017, filed October 22, 1936.

I claim:

1. Emulsions comprising a continuous phase and a discontinuous phase dispersed therein by means of a reaction product of an acid-reacting fatty substance with one of the group consisting of morpholine and water-soluble, highly basic morpholine addition and substitution products.

2. Emulsions comprising a continuous phase and a discontinuous phase dispersed therein by means of a reaction product of an acid-reacting fatty substance with one of the group consisting of morpholine and water-soluble, highly basic morpholine addition and substitution products; said discontinuous phase being adapted to form a film on surfaces coated with said emulsions, and said film being difficultly dispersible after the evaporation of said continuous phase.

3. Emulsions comprising a volatile continuous phase and a discontinuous phase dispersed therein by means of a reaction product of an acid-reacting fatty substance with morpholine; said discontinuous phase being adapted to form a film on surfaces coated with said emulsions, and said film being difficultly dispersible after the evaporation of said continuous phase.

4. Emulsions comprising a volatile continuous phase and a discontinuous phase dispersed therein by means of a reaction product of an acid-reacting fatty substance with N-methyl morpholine; said discontinuous phase being adapted to form a film on surfaces coated with said emulsions, and said film being difficultly dispersible after the evaporation of said continuous phase.

5. Emulsions comprising a volatile continuous phase and a discontinuous phase dispersed therein by means of a reaction product of an acid-reacting fatty substance with 2,6-dimethyl morpholine; said discontinuous phase being adapted to form a film on surfaces coated with said emulsions, and said film being difficultly dispersible after the evaporation of said continuous phase.

6. Surface coating emulsions comprising a volatile continuous phase and a discontinuous phase dispersed therein by means of a reaction product of an acid-reacting fatty substance with one of the group consisting of morpholine and water-soluble, highly basic morpholine addition and substitution products whose boiling points, or the boiling points of whose azeotropic aqueous solutions lie between about 90° and about 150° C.; said discontinuous phase being adapted to form a film on surfaces coated with said emulsions, and said film being difficultly dispersible after the evaporation of said volatile continuous phase.

7. Surface coating emulsions comprising a volatile aqueous continuous phase and an oil phase dispersed therein by means of a reaction product of an acid-reacting fatty substance with one of the group consisting of morpholine and water-soluble, highly basic morpholine addition and substitution products whose boiling points, or the boiling points of whose azeotropic aqueous solutions lie between about 90° and about 150° C.; said oil phase being adapted to form a film on surfaces coated with said emulsions, and said film being difficultly dispersible after the evaporation of said volatile continuous phase.

8. Surface coating emulsions comprising a volatile continuous phase and an oil phase dispersed therein by means of a reaction product of an acid-reacting fatty substance with one of the group consisting of morpholine and water-soluble, highly basic morpholine addition and substitution products whose boiling points, or the boiling points of whose azeotropic aqueous solutions lie between about 90° and about 150° C.; said oil phase containing a wax and being adapted to form a film on surfaces coated with said emulsions, and said film being difficultly dispersible after the evaporation of said volatile continuous phase.

9. Surface coating emulsions comprising a volatile continuous phase and an oil phase dispersed therein by means of a reaction product of an acid-reacting fatty substance with morpholine; said oil phase containing a wax and being adapted to form a film on surfaces coated with said emulsions, and said film being difficultly dispersible after the evaporation of said volatile continuous phase.

10. Surface coating emulsions comprising a volatile continuous phase and an oil phase dispersed therein by means of a reaction product of an acid-reacting fatty substance with N-methyl morpholine; said oil phase containing a wax and being adapted to form a film on surfaces coated with said emulsions, and said film being difficultly dispersible after the evaporation of said volatile continuous phase.

11. Surface coating emulsions comprising a volatile continuous phase and an oil phase dispersed therein by means of a reaction product of an acid-reacting fatty substance with 2,6-dimethyl morpholine; said oil phase containing a wax and being adapted to form a film on surfaces coated with said emulsions, and said film being difficultly dispersible after the evaporation of said volatile continuous phase.

12. A wax composition comprising an emulsion of wax in water having therein as an emulsifying agent an unstable volatile amino compound with a fatty acid of high molecular weight, forming a wax-soluble soap, so as to hold the wax dispersed in such small particle size that it will dry bright or with substantial lustre when merely applied to a surface and exposed to the atmosphere without rubbing, said emulsifying agent being stable in the presence of the water and not evaporating selectively in water solution but decomposable by the drying of the composition whereby the composition loses its ability to re-emulsify in the presence of water.

13. A self-lustering aqueous wax composition which forms a substantially soap-free coating comprising a wax-in-water emulsion having therein the loose-bond reaction product of morpholine and a high molecular weight fatty acid as the emulsifying agent.

14. A self-lustering aqueous wax emulsion comprising a waxy component including carnauba wax, a fatty acid of high molecular weight, morpholine and water.

ALEXANDER L. WILSON.